(12) United States Patent
Sapena Soler

(10) Patent No.: US 10,790,986 B2
(45) Date of Patent: Sep. 29, 2020

(54) METHOD FOR THE CERTIFICATION OF ELECTRONIC MAIL CONTAINING A RECOGNISED ELECTRONIC SIGNATURE ON THE PART OF A TELECOMMUNICATIONS OPERATOR

(71) Applicant: LLEIDANETWORKS SERVEIS TELEMATICS, S.A., Lleida (ES)

(72) Inventor: Francisco Sapena Soler, Lleida (ES)

(73) Assignee: LLEIDANETWORKS SERVEIS TELEMATICS, S.A., Lleida (ES)

( * ) Notice: Subject to any disclaimer, the term of this patent is extended or adjusted under 35 U.S.C. 154(b) by 262 days.

(21) Appl. No.: 16/066,594

(22) PCT Filed: Dec. 22, 2016

(86) PCT No.: PCT/EP2016/082298
§ 371 (c)(1),
(2) Date: Jun. 27, 2018

(87) PCT Pub. No.: WO2017/114731
PCT Pub. Date: Jul. 6, 2017

(65) Prior Publication Data
US 2019/0013951 A1    Jan. 10, 2019

(30) Foreign Application Priority Data
Dec. 28, 2015    (EP) .................................... 15382665

(51) Int. Cl.
*H04L 29/06* (2006.01)
*H04L 9/32* (2006.01)
(Continued)

(52) U.S. Cl.
CPC ......... *H04L 9/3247* (2013.01); *G06Q 10/107* (2013.01); *H04L 51/00* (2013.01);
(Continued)

(58) Field of Classification Search
CPC ....... H04L 9/3247; H04L 51/00; H04L 51/30; H04L 63/101; H04L 63/102;
(Continued)

(56) References Cited

U.S. PATENT DOCUMENTS 5,862,978 A * 1/1999 Forrest .................. B42D 5/026
229/300
6,314,454 B1 * 11/2001 Wang .................. G06Q 10/107
358/402

(Continued)

FOREIGN PATENT DOCUMENTS

EP    2632096 A1    8/2013

OTHER PUBLICATIONS

RFC 6109, La Posta Elettronica Certificata—Italian Certified Electronic Mail, IETF, Apr. 2011.*
(Continued)

*Primary Examiner* — David Garcia Cervetti
(74) *Attorney, Agent, or Firm* — Hayes Soloway P.C.

(57) ABSTRACT

The object of the invention is a method for the certification of electronic mails with a recognised electronic signature wherein a telecommunications operator certifies the sending of a certified electronic mail on the part of a user client of said operator to another user non-client of the telecommunications operator respecting at all times the chain of custody and the original recognised electronic signatures in the resending and the certification, generating evidence at all times of the transaction, in such a way that it can be used as reinforced evidence in any court or as a reliable demonstration of a given transaction.

5 Claims, 2 Drawing Sheets

(51) Int. Cl.
  *H04L 12/58* (2006.01)
  *G06Q 10/10* (2012.01)
(52) U.S. Cl.
  CPC .............. *H04L 51/30* (2013.01); *H04L 51/34* (2013.01); *H04L 63/0823* (2013.01); *H04L 63/101* (2013.01); *H04L 63/102* (2013.01); *H04L 63/123* (2013.01)
(58) Field of Classification Search
  CPC ... H04L 63/123; H04L 51/34; H04L 63/0823; G06Q 10/107
  See application file for complete search history.

(56) References Cited

U.S. PATENT DOCUMENTS

| | | | | |
|---|---|---|---|---|
| 6,327,656 B2* | 12/2001 | Zabetian | ............ | G06Q 20/3821 380/260 |
| 6,760,752 B1* | 7/2004 | Liu | ............ | H04L 63/0428 |
| 6,904,521 B1* | 6/2005 | Jivsov | ............ | H04L 51/30 713/155 |
| 6,990,581 B1* | 1/2006 | Rubin | ............ | H04L 9/3247 713/170 |
| 7,353,204 B2* | 4/2008 | Liu | ............ | G06Q 20/02 705/50 |
| 7,386,727 B1* | 6/2008 | Rover | ............ | G06Q 20/108 380/247 |
| 7,599,993 B1* | 10/2009 | Murphy | ............ | G06Q 10/107 709/206 |
| 7,730,145 B1* | 6/2010 | Frenkel | ............ | H04L 51/12 709/206 |
| 7,886,144 B2* | 2/2011 | Brown | ............ | H04L 63/0428 713/156 |
| 8,117,438 B1* | 2/2012 | Albisu | ............ | H04L 63/0442 713/156 |
| 8,341,399 B2* | 12/2012 | Brown | ............ | H04L 63/12 713/156 |
| 8,600,904 B1* | 12/2013 | Schneider | ............ | G06Q 30/00 705/330 |
| 9,160,725 B2* | 10/2015 | Tomkow | ............ | H04L 63/0876 |
| 9,235,870 B2* | 1/2016 | Kottoor | ............ | G06Q 10/10 |
| 9,917,801 B2* | 3/2018 | Sapena Soler | ............ | H04L 51/04 |
| 2001/0027523 A1* | 10/2001 | Wakino | ............ | H04L 51/00 726/26 |
| 2001/0034849 A1* | 10/2001 | Powers | ............ | H04L 29/06 726/30 |
| 2001/0047388 A1* | 11/2001 | Kondo | ............ | H04L 51/063 709/206 |
| 2002/0029248 A1* | 3/2002 | Cook | ............ | G06Q 30/0601 709/206 |
| 2002/0046250 A1* | 4/2002 | Nassiri | ............ | H04L 51/30 709/206 |
| 2002/0143710 A1* | 10/2002 | Liu | ............ | H04L 9/083 705/75 |
| 2003/0023870 A1* | 1/2003 | Geros | ............ | G07F 17/12 726/27 |
| 2004/0078394 A1* | 4/2004 | Powell | ............ | G06F 21/606 |
| 2004/0093499 A1* | 5/2004 | Arditi | ............ | H04L 9/3263 713/176 |
| 2004/0236837 A1* | 11/2004 | Sherwood | ............ | H04L 51/14 709/207 |
| 2004/0263901 A1* | 12/2004 | Critelli | ............ | H04L 51/34 358/1.15 |
| 2005/0198508 A1* | 9/2005 | Beck | ............ | H04L 51/12 713/170 |
| 2005/0198511 A1* | 9/2005 | Tomkow | ............ | H04L 63/123 713/176 |
| 2005/0246538 A1* | 11/2005 | Brown | ............ | H04L 63/04 713/176 |
| 2006/0041505 A1* | 2/2006 | Enyart | ............ | H04L 51/00 705/40 |
| 2006/0047762 A1* | 3/2006 | Su | ............ | G06Q 10/107 709/206 |
| 2006/0080533 A1* | 4/2006 | Bradbury | ............ | H04L 51/00 713/170 |
| 2006/0089970 A1* | 4/2006 | Pearson | ............ | H04L 51/12 709/206 |
| 2006/0123476 A1* | 6/2006 | Yaghmour | ............ | H04L 63/126 726/22 |
| 2006/0143271 A1* | 6/2006 | Murphy | ............ | G06Q 10/107 709/206 |
| 2006/0168443 A1* | 7/2006 | Miller | ............ | H04L 51/00 713/156 |
| 2006/0200527 A1* | 9/2006 | Woods | ............ | H04L 51/12 709/206 |
| 2006/0212703 A1* | 9/2006 | Kojima | ............ | H04L 63/12 713/175 |
| 2006/0259762 A1* | 11/2006 | Tanimoto | ............ | H04L 9/3247 713/156 |
| 2007/0005713 A1* | 1/2007 | LeVasseur | ............ | H04L 51/18 709/206 |
| 2007/0011247 A1* | 1/2007 | Bayon | ............ | H04L 51/12 709/206 |
| 2007/0011253 A1* | 1/2007 | Taylor | ............ | H04L 51/12 709/206 |
| 2007/0130464 A1* | 6/2007 | Swedor | ............ | H04L 9/3263 713/170 |
| 2007/0143407 A1* | 6/2007 | Avritch | ............ | G06Q 10/107 709/206 |
| 2007/0174402 A1* | 7/2007 | Tomkow | ............ | G06Q 10/107 709/206 |
| 2008/0118070 A1* | 5/2008 | Yeap | ............ | H04L 63/0823 380/282 |
| 2008/0141026 A1* | 6/2008 | Cordery | ............ | H04L 9/3263 713/156 |
| 2008/0187140 A1* | 8/2008 | McGillian | ............ | H04L 51/00 380/278 |
| 2008/0260153 A1* | 10/2008 | Almeida | ............ | H04L 9/302 380/259 |
| 2008/0278740 A1* | 11/2008 | Bird | ............ | H04L 69/329 358/1.15 |
| 2008/0282079 A1* | 11/2008 | Yaghmour | ............ | H04L 63/0428 713/150 |
| 2008/0313466 A1* | 12/2008 | Philips | ............ | H04L 63/0414 713/176 |
| 2009/0094452 A1* | 4/2009 | Shao | ............ | H04L 9/321 713/151 |
| 2009/0172399 A1* | 7/2009 | Schmid | ............ | G06Q 10/107 713/168 |
| 2009/0187764 A1* | 7/2009 | Astakhov | ............ | H04L 9/3263 713/170 |
| 2009/0198997 A1* | 8/2009 | Yeap | ............ | H04L 63/0823 713/155 |
| 2009/0320109 A1* | 12/2009 | Salada | ............ | G06Q 10/107 726/6 |
| 2009/0327714 A1* | 12/2009 | Yaghmour | ............ | H04L 63/126 713/168 |
| 2010/0100465 A1* | 4/2010 | Cooke | ............ | H04L 9/3297 705/34 |
| 2010/0198712 A1* | 8/2010 | Benisti | ............ | G06Q 30/04 705/34 |
| 2010/0250691 A1* | 9/2010 | Tomkow | ............ | H04L 63/0442 709/206 |
| 2010/0257352 A1* | 10/2010 | Errico | ............ | G06F 21/32 713/151 |
| 2010/0313264 A1* | 12/2010 | Xie | ............ | H04L 63/101 726/22 |
| 2010/0325005 A1* | 12/2010 | Benisti | ............ | G06Q 40/12 705/26.1 |
| 2011/0040978 A1* | 2/2011 | Tsao | ............ | G06Q 10/107 713/181 |
| 2011/0113109 A1* | 5/2011 | LeVasseur | ............ | H04L 51/12 709/206 |
| 2011/0276638 A1* | 11/2011 | Errico | ............ | H04L 63/0861 709/206 |
| 2011/0320480 A1* | 12/2011 | Kisin | ............ | G06Q 50/18 707/769 |
| 2012/0131346 A1* | 5/2012 | Sherkin | ............ | H04W 12/1006 713/176 |

(56) References Cited

U.S. PATENT DOCUMENTS

| | | | |
|---|---|---|---|
| 2012/0198017 A1* | 8/2012 | LeVasseur | H04L 63/168 709/206 |
| 2013/0218989 A1* | 8/2013 | Sapena Soler | G06Q 10/107 709/206 |
| 2013/0218990 A1* | 8/2013 | Sapena Soler | H04L 51/30 709/206 |
| 2014/0115073 A1* | 4/2014 | Sapena Soler | H04L 51/34 709/206 |
| 2015/0074006 A1* | 3/2015 | Soler | H04L 63/0823 705/311 |
| 2015/0172251 A1* | 6/2015 | Tico Farre | H04L 51/34 709/206 |
| 2016/0125412 A1* | 5/2016 | Cannon | G06Q 20/4014 705/44 |
| 2017/0026329 A1* | 1/2017 | Benisti | G06Q 20/102 |
| 2018/0054414 A1* | 2/2018 | LeVasseur | G06F 21/606 |
| 2019/0089695 A1* | 3/2019 | Sapena Soler | H04L 67/28 |

OTHER PUBLICATIONS

Petrucci et al.; La Posta Elettronica Certificata—Italian Certified Electronic Mail; Internet Engineering Task Force (IETF); Apr. 2011; p. 1-65.

* cited by examiner ns operator to be able to receive, redirect, deliver and certify electronic mails signed with a recognised electronic signature of any transmitting user client of the operator to one or several receivers non-clients of the operator non-intrusively, respecting the electronic signatures of the original mails to avoid breaking the chain of custody, resending it intact with the original signatures and adapted to the DMARC standard, generating proof of all operation transactions so as to, finally, sign it digitally as the telecommunications operator and deliver to transmitting user clients a certificate as a trusted third party with the transmitter's details, date of transmission, the full text sent, the original mail signed electronically by the user respecting the original signature, date and time of delivery and the final circumstances in the event of non-delivery or delay in the delivery to the non-client receiver.

METHOD FOR THE CERTIFICATION OF ELECTRONIC MAIL CONTAINING A RECOGNISED ELECTRONIC SIGNATURE ON THE PART OF A TELECOMMUNICATIONS OPERATOR

OBJECT OF THE INVENTION

The object of the invention is a method for a telecommunications operator to be able to receive, redirect, deliver and certify electronic mails signed with a recognised electronic signature of any transmitting user client of the operator to one or several receivers non-clients of the operator non-intrusively, respecting the electronic signatures of the original mails to avoid breaking the chain of custody, resending it intact with the original signatures and adapted to the DMARC standard, generating proof of all operation transactions so as to, finally, sign it digitally as the telecommunications operator and deliver to transmitting user clients a certificate as a trusted third party with the transmitter's details, date of transmission, the full text sent, the original mail signed electronically by the user respecting the original signature, date and time of delivery and the final circumstances in the event of non-delivery or delay in the delivery to the non-client receiver.

BACKGROUND OF THE INVENTION

It is known that currently electronic communications have become an essential and indispensable tool for any operation, both legal and illegal. Communications are used for all types of movements, generation of calls, messages, etcetera, from an origin to a destination.

Telecommunications operators are the parties that provide the infrastructures that manage, direct and store a great part of this traffic. These telecommunications operators are subject to regulation, among others, for the use of the radio spectrum which is limited, or for the use of telephone numbering resources which are also finite.

Telecommunications operators moreover register the operations made by users with the objective, among others, of charging, registering numbers associated thereto, as billing references, and to record any other transactional detail used for billing the user. These registers are preserved for later verifications of charges and/or monitoring of traffic on the part of the user.

Occasionally, the judicial authorities request telecommunications operators to provide registered details of electronic transactions made, as they consider them to be trusted third parties for the purpose of providing these details, along with any other detail that could help to determine the private individuals or legal entities that have carried out the action of interest.

Once the details requested by the judicial authorities have been located, the operator issues a certificate which explicitly declares the requested transactional details, frequency, destinations, and any other information requested by the pertinent judicial authority.

This methodology, when requested by any of the parties to a telecommunications operator and presented as evidence, has even been recently accepted as evidence by our supreme court (ATS 2501/2013, Supreme Court of Spain, Civil Chamber).

The state of the art is familiar with diverse methods and systems for the sending of certified electronic mail, some based on the sending on the part of the client of a link to a web environment controlled by a trusted third party where the certified content is downloaded, having the basic drawback of requiring the will of the notified party to download said content in order to generate the certificate, and others wherein digital verifications are added to the content and which simulate to be the transmitter, resending it to the destination. This last one suffers from three serious drawbacks:

a) On resending on behalf of the user, the recognised electronic signature is broken as the conditions of origin change totally, breaking the chain of custody and generating mistrust.

b) Adding verifications inside for subsequent checking of the certification of the electronic mail again breaks the originally recognised electronic signature and the chain of custody anew.

c) On resending on behalf of the user as if the user, the certified electronic mail clashes with the DMARC standard which is being imposed as a the standard on a worldwide scale, preventing the effective delivery of the certified electronic mail.

The invention that is the object of this application provides a solution to the disadvantages mentioned above, not requiring a subsequent download of the content to be certified, respecting both the user's original recognised electronic signature to maintain the chain of custody, and the full functionality of the service under the DMARC standard; with the process resulting in a certificate issued by a telecommunications operator containing the original message without breaking the original recognised signatures which accredits that the operator sent that electronic mail content to a destination, on a determined date and time and that it was finally delivered or not to its official electronic representative, including also the transmission details, transmitted details, attachments, a single registration number and any transactional detail used.

DESCRIPTION OF THE INVENTION

According to that mentioned above, the object of the invention is a method for the sending of an electronic mail with a recognised electronic signature to be certified by a communications operator in such a way that the destination receives two copies, the original one from the client and the one from the telecommunications operator without simulating to be the original client, respecting the recognised electronic signatures and the chain of custody. The client of the operator or transmitter, receives a certificate according to who sent the original electronic mail, including the original mail, the viewable content, date, time and traceability of same, a single transaction number; and finally the date, time and circumstances of the delivery if such were possible.

The method for creating the electronic mail certified by a telecommunications operator that is the object of the invention is characterised in that it comprises the following steps and in that it incorporates at least one external mail server of the operator's client, a destination server of the certified mail, an incoming mail server of the operator, a database server of copies and fragmented elements, an outgoing mail server of the operator, a TSA timestamp server, a database server of elements sent and a data processing unit as the certification server all interconnected with each other.

Transmission by the client of the telecommunications operator of an electronic mail to a determined destination using any platform through their internet provider, copying a mail address of the server of the telecommunications operator, for example correo@certificado.lleida.net Receipt of the classic electronic mail at the destination by means of its authorised digital representative.

Receipt of the copy in the operator's incoming mail server of the message transmitted by the user client of the telecommunications operator.

Check that the user is authorised, has credit to certify mails and move on to insertion and registration in the database of the text and components received.

Creation in the data processing unit of the telecommunications operator of an electronic mail that will be transmitted from an address of the server of the telecommunications operator noreply@mailcert.lleida.net encapsulating the content sent by the operator's client to respect the recognised original digital signatures, inserting specifically in the subject of the electronic mail CERTIFIED ELECTRONIC MAIL.

Sending of the encapsulated mail on the part of the outgoing electronic mail server.

Acceptance or not by the authorised digital representative of the non-client destination of the encapsulated electronic mail, Final generation of the certificate of the telecommunications operator, including the original mail respecting the recognised digital signatures, the details sent, received, dates and times of transmission and reception and application of the recognised digital signature and the timestamp on the part of the telecommunications operator.

Sending of the certificate to the transmitting user through the mail server.

According to the above, the method that is the object of the invention likewise offers the advantage of not manipulating the original mail, maintaining the chain of custody and allowing the use of digital forms recognised by the user, likewise being compatible with the DMARC standard, as the encapsulated copy of the mail is not resent in the name of the user but rather in the name of the telecommunications operator. Finally, evidence is generated of transmission, reception, and acceptance of the content on the part of a telecommunications operator.

DESCRIPTION OF THE DRAWINGS

To complement the description being made and for the purpose of contributing to a better understanding of the invention, according to a preferred example of a practical embodiment thereof, a set of drawings is attached as an integral part of said description, wherein by way of illustration and not limitation, the following has been represented.

PREFERRED EMBODIMENT OF THE INVENTION

Figure 1:
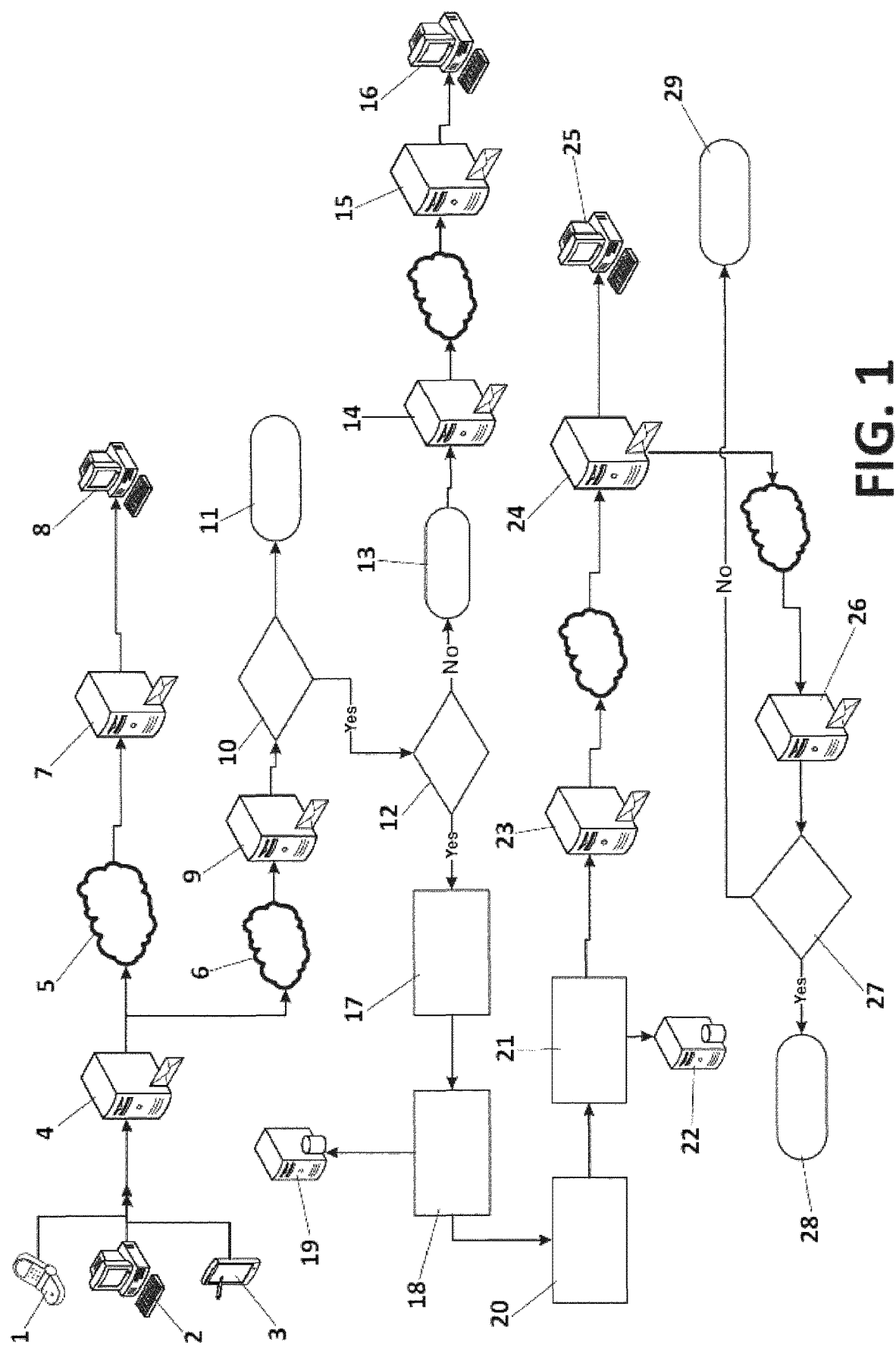
FIG. 1. —Shows a flow chart of an example of embodiment of the method that is the object of the invention of the start of creation of the certified electronic mail and the delivery or not of the encapsulated copy.
Figure 2:
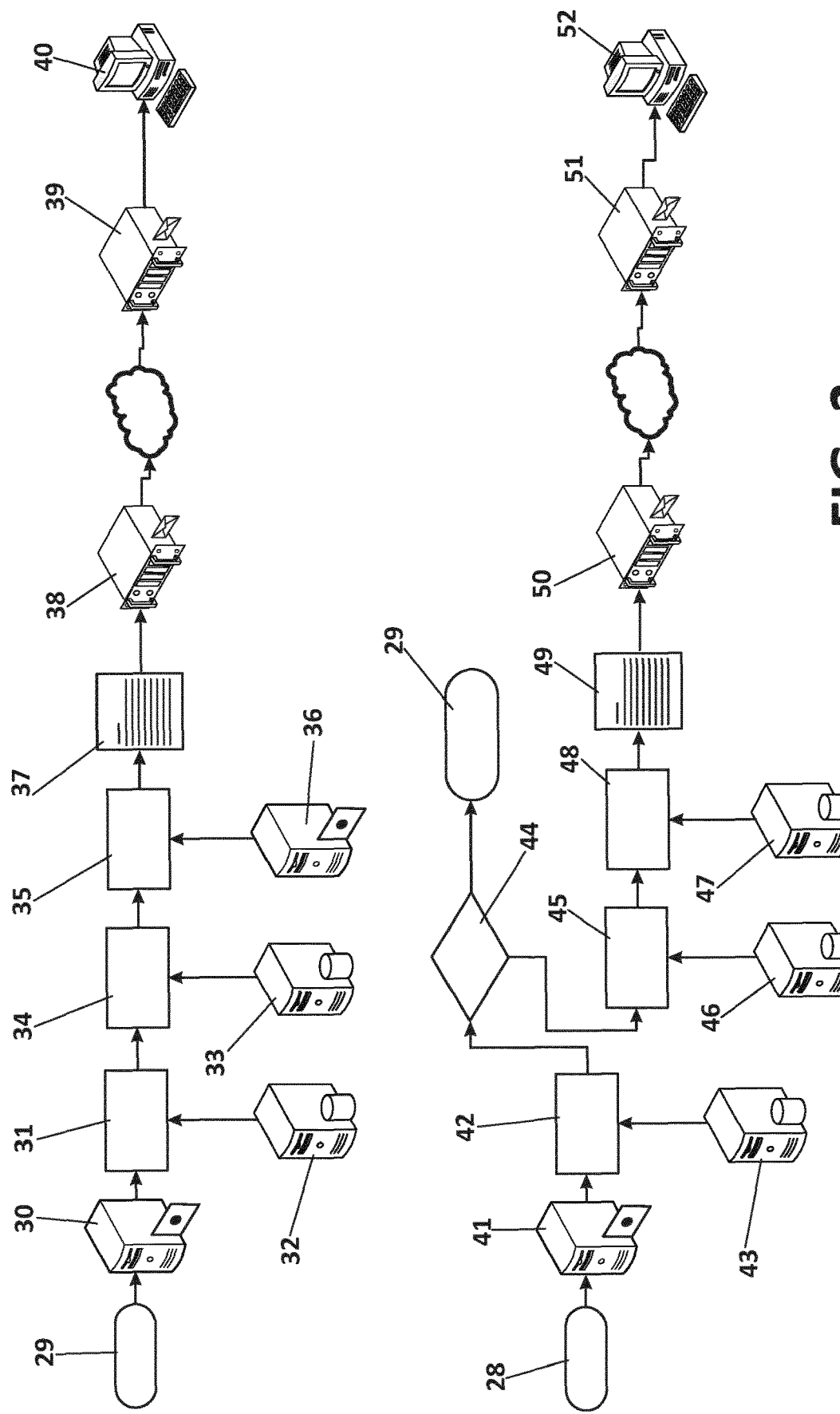
FIG. 2. —Shows a flow chart of an example of embodiment of the method that is the object of the invention of the composition and sending of the final certificate in the cases of delivery or non-delivery of the encapsulated electronic mail.

In the light of FIGS. 1 and 2 wherein a series of diagrams are represented referring to a method that is the object of the invention, method intended to certify electronic mails containing a recognised electronic signature on the part of a telecommunications operator comprising from sending an electronic mail from a transmitter (1,2,3), user of the telecommunications operator, through to reception of the certificate confirming the sending was effected, it was delivered, with the content and transmission details used, all of the above signed with a recognised electronic signature of the operator and timestamp of a third party.

The transmitting user client of the telecommunications operator, when wishing to send a certified electronic mail send the mail through any platform, PC, Tablet or mobile phone copying a mail address of an incoming mail server of the telecommunications operator such as for example correo@certificado.lleida.net. To do this, on the part of a the transmitter (1,2,3), which is a user of the telecommunications operator, at least one electronic mail is generated, to make the electronic mail arrive at a client mail server of the telecommunications operator (4,15) for example the electronic mail is sent to the client mail server of Lleida.net, the latter belonging to any internet provider, and it is delivered to a destination server which for legal purposes is the authorised electronic representative, in other words it is made to arrive at a mail destination server (7, 24) via the internet (5) to make it arrive at a certified mail destination (8,25), since it is at internet level where messages can be delivered to a determined destination, likewise a copy of this message is delivered to an incoming mail server of the operator (9), the incoming mail server of Lleida.net in this example.

The operator's incoming mail server (9) sends the electronic mail to a certification data processing server (Mailcert) which forms part of the telecommunications operator and will check whether the user is on the white list, in other words, is registered with the system to be able to send certified electronic mails. If not registered, the mail is ignored, if registered it moves on to verifying that the user has credit, this implies checking (10) that the user (1,2,3) has certification privileges by means of comparison with a list of users/privileges, check which is carried out by means of sending the electronic mail to a certification data processing server.

If the user in question does not have any credit, an electronic mail is generated indicating the lack of same, sending it to an outgoing mail server of the operator (23, 26,38,50) which will deliver it finally to the user (1,2,3) which is the user client of the communications operator.

If the user does have credit then it proceeds to certify (17) the electronic mail wherein said certification in turn comprises generating a copy (18) of the electronic mail and decomposing the electronic mail into its parts wherein said parts comprise: transmission details, reception details and content of the mail for processing of same, said details being preferably saved in a first database (19,32,43) together with the copy (18).

Subsequently the copy (18) of the electronic mail is encapsulated (20) in a container and a certified mail (21) is generated which comprises the encapsulated copy (18) of the electronic mail then made to arrive at an outgoing mail server of the operator (23,26), to make the certified mail (21) arrive at the mail destination server (7, 24) from the operator's outgoing mail server (23,26,38,50) and to make the certified mail (21) arrive from the mail destination server (7, 24) to: the certified mail destination (8,25), and to the operator's outgoing mail server (23,26,38,50).

A certified mail (21) is generated from an electronic mail address with origin in the certification data processing server that forms part of the telecommunications operator as can be: service@correo electrónicocert.lleida.net with the subject of the message being CERTIFIED ELECTRONIC MAIL, adding the text of the original subject, and as many control texts as may be considered necessary. The fact of being sent as certification server service@correo electrónicocert.lleida.net from the telecommunications operator and not placing as origin the original electronic mail address of the client allows the service to be DMARC-compliant as it does not supplant the client, in spite of giving us authorisation to deliver an electronic mail on the client's behalf.

Within the text of the certified mail (21) a banner is included and indications confirming that it is a certified message and finally it is encapsulated (20), in other words, the entire original message is included for the purpose of respecting the original recognised electronic signatures to avoid any manipulation of the inside breaking the recognised signature and generating mistrust as to the veracity of the message. The encapsulated copy (18) of the electronic mail is saved in a second database (22,33,46) and is made to arrive at the operator's outgoing mail server (23,26,38,50) for sending of same.

The operator's outgoing mail server (23,26,38,50) will deliver the encapsulated copy (18) of the electronic mail, for its delivery, but even so will wait for a subsequent time of between 10 minutes and one hour for a subsequent rejection response, in other words, initially the electronic mail server at the destination will accept everything in the first instance and subsequently it will reject it, this being a behaviour that the system self-adjusts to automatically.

If the certified electronic mail was finally able to be delivered, the method moves on to the OK process of FIG. 2 and if the certified electronic mail could not be delivered then it moves on to the NOOK process also present in FIG. 2.

The operator's outgoing mail server (23,26,38,50), will deliver the encapsulated electronic mail to its authorised digital representative, for its delivery, but even so will wait for a subsequent time of between 10 minutes and one hour for a subsequent rejection response, in other words, initially a mail destination server (7, 24) accepts everything in the first instance and subsequently rejects it, this being a behaviour that the method described herein self-adjusts to automatically.

There is a check of delivery (27) of the certified mail (21) at the certified mail destination (8,25). If the certified mail (21) was finally able to be delivered, the method moves on to the OK process of FIG. 2 and if the certified electronic mail was not able to be delivered the method moves on to the NOOK process also present in FIG. 2.

With the certified mail (21) delivered the method moves on to the process of generating a certificate (37,49) of the operator itself, in other words the certified mail (21) is made to arrive from the mail destination server (7, 24) to the certified mail destination (8,25), and to the operator's outgoing mail server (23,26,38,50) given that on carrying out the delivery check (27) of the certified mail (21) at the certified mail destination (8,25) an OK was obtained. Next, a certificate (37,49) is generated by means of a certification server (30,41) of the telecommunications operator wherein said certificate (37,49) comprises a first part (31,42) which in turn comprises transmission details, reception details and content of the mail, and a second part (34,45) which in turn comprises details of the arrival of the certificate (21) at the operator's outgoing mail server (23,26), and a digital signature and a timestamp (35,48) of the telecommunications operator.

To do this, the content and original electronic mails are recovered from the first database (19,32,43) of initial copy composing the first part of the certificate (37,49). Once this is done, it is verified whether the mail destination server (7, 24) is on the bouncing/blacklisting list, by means of a verification (44) subsequent to the generation of the first part (31,42) wherein said verification (44) comprises checking whether the destination server of the certified electronic mail (8,25) is on a list of bouncing/blacklisting servers which by default accept all messages and subsequently reject them when the addressee of the corresponding certified mail (8,25) does not exist. In other words, it is verified (44) whether it is or not on the list of servers which by default accept all messages and later reject them when the user does not exist, checking whether a subsequent message of rejection has arrived from the mail destination server (7, 24). If a subsequent message of rejection has arrived then the method moves on to the NOOK process.

If the verification (44) gives as a result that the certified mail destination server (8,25) is on the list of bouncing/blacklisting servers, it is proceeded to add to the certificate (37,49) details referring to the non-existence of the addressee at the certified mail destination server (8,25). If the verification (44) gives as a result that the mail destination server (7, 24) is not on the blacklist or bouncing list the second part of the certificate is composed with all of the transactional details, adding the timestamp (35,48) of a third party and signing the certificate (37,49) with the recognised electronic signature of the telecommunications operator as indicated previously in describing the content of the second part (34,45) of the certificate (37,49).

Having finalised the certificate (37,49), an electronic mail is generated to which this generated certificate (37,49) is attached, which is sent to the telecommunications operator's outgoing mail server (23,26), which will deliver it finally to the electronic representative authorised to deliver it to the client.

The NOOK process is the process that is used when for any circumstance it has not been possible to deliver the certified mail (21) to the certified mail destination (8,25), emphasising that in the process of sending reliable notifications, both delivery and non-delivery are just as important, given that the aim is to demonstrate a publicly explicit and express will to send a content even if there may be circumstances that prevent it, transforming the reliable notification into a diligent one; in other words, everything technically possible has been done to effect the delivery.

Once it is determined that the certified mail (21) moves onto the NOOK process the certificate (37,49) is recomposed again identifying the addressee and including the latter's details in the certificate (37,49) along with all vicissitudes that have prevented effective delivery of the message to its authorised electronic representative, for example it is possible to add to the certificate (37,49) details referring to the non-delivery such as the time of attempted delivery, delivery address, identification of the addressee, etc. Once the certificate (37,49) is completed, it is electronically signed with the recognised digital signature of the telecommunications operator and the timestamp of a third party is added to it.

Once the document is signed, an electronic mail is generated to which this pdf document is attached and it is sent by electronic mail to the transmitter (1,2,3), which is a user of the telecommunications operator.

With the finally generated certificates (37,49), the transmitter (1,2,3), which is a user of the telecommunications operator, can demonstrate reliably that it sent a certified mail (21) to a determined certified mail destination (8,25), using its own recognised electronic signature without modifying the electronic mail in any of its transactions or preventing its delivery due to the new standards implemented on the internet.

The invention claimed is:

1. A method of certification of digitally signed electronic mail, which is carried out by a telecommunications operator, the method comprising:
   i. generating by a transmitter, which is a user of the telecommunications operator, at least one digitally signed electronic mail,
   ii. making the digitally signed electronic mail arrive at a client mail server of the telecommunications operator,
   iii. sending the digitally signed electronic mail to:
       a mail destination server through the internet to make the digitally signed electronic mail arrive at a certified mail destination, and
       an incoming mail server of the telecommunications operator,
   iv. sending the digitally signed electronic mail from the incoming mail server of the telecommunications operator to a certification data processing server which forms a part of the telecommunications operator,
   v. certifying, by the certification data processing server, the digitally signed electronic mail, wherein said certifying comprises:
       generating a copy of the digitally signed electronic mail,
       decomposing the digitally signed electronic mail into parts, wherein said parts comprise transmission details, reception details and content of the digitally signed electronic mail,
       encapsulating in a container, by the certification data processing server, the copy of the digitally signed electronic mail,
       generating a certified mail, by the certification data processing server, which comprises the encapsulated copy of the digitally signed electronic mail,
       sending said certified mail to an outgoing mail server of the telecommunications operator, from the certification data processing server,
       making the certified mail arrive at the mail destination server from the outgoing mail server of the telecommunications operator, and
       making the certified mail arrive from the mail destination server to the certified mail destination, the outgoing mail server of the telecommunications operator,
   vi. delivering the encapsulated copy of the digitally signed electronic mail and waiting for a subsequent time period set between ten minutes and one hour for a subsequent rejection response to avoid the mail destination server initially accepting and subsequently rejecting,
   vii. carrying out a delivery check of the certified mail at the certified mail destination,
   viii. if the certified mail was able to be delivered, generating a certificate by a certification server of the telecommunications operator wherein said certificate comprises:
       a. a first part comprising: transmission details, reception details and content of the digitally signed electronic mail, and
       b. a second part comprising details of delivery of the certificate at the outgoing mail server of the telecommunications operator, and
   ix. carrying out a verification subsequent to the generation of the first part, said verification comprising:
       checking whether the mail destination server of the digitally signed electronic mail is on a list of bouncing/blacklisting servers which by default accept messages and subsequently reject them when an addressee of the certified mail does not exist,
       adding details to the certificate referring to the non-existence of the addressee at the certified mail destination server, when the verification gives as a result that the certified mail destination server is on the list of bouncing/blacklisting servers, and
       composing the second part of the certificate, adding a timestamp of a third party and signing the certificate with the electronic signature of the telecommunications operator, when the mail destination server is not on the list of bouncing/blacklisting servers,
   x. making the certificate arrive at the transmitter.

2. The method according to claim 1 further comprising checking that the transmitter has certification privileges by comparison with a list of users/privileges, check that is carried out by sending the digitally signed electronic mail to the certification data processing server.

3. The method according to claim 1 further comprising carrying out a dumping in a first database of the copy of the digitally signed electronic mail and its parts, once the digitally signed electronic mail has been decomposed.

4. The method according to claim 1 further comprising carrying out a dumping of the certified mail in a second database which comprises elements that have been made to arrive at the outgoing mail server of the telecommunications operator.

5. The method according to claim 1 wherein the delivery check gives as a result a non-delivery of the certified mail at the certified mail destination and the method further comprises adding details to the certificate referring to the non-delivery wherein said details comprise: time of attempted delivery and delivery address.

* * * * *